United States Patent
Fukuoka

(10) Patent No.: US 6,238,048 B1
(45) Date of Patent: May 29, 2001

(54) TEMPLE STRUCTURE FOR EYEGLASSES

(75) Inventor: Hiroshi Fukuoka, Sabae (JP)

(73) Assignee: Euro Vision Co., Ltd., Sabae (JP)

( * ) Notice: Subject to any disclaimer, the term of this patent is extended or adjusted under 35 U.S.C. 154(b) by 0 days.

(21) Appl. No.: 09/494,734

(22) Filed: Jan. 31, 2000

(30) Foreign Application Priority Data

Feb. 12, 1999 (JP) .................................................. 11-376210

(51) Int. Cl.$^7$ ...................................................... G02C 5/16
(52) U.S. Cl. ........................ 351/114; 351/121; 351/153; 16/228
(58) Field of Search ...................................... 351/111, 113, 351/114, 119, 121, 153; 16/228

(56) References Cited

U.S. PATENT DOCUMENTS

| | | | |
|---|---|---|---|
| 5,469,232 | * 11/1995 | Ichimura | 351/111 |
| 5,755,010 | * 5/1998 | Lehnert | 351/113 |
| 5,844,655 | * 12/1998 | Chang | 351/153 |
| 5,847,801 | * 12/1998 | Masunaga | 351/153 |

* cited by examiner

*Primary Examiner*—Huy Mai
(74) *Attorney, Agent, or Firm*—Kanesaka & Takeuchi

(57) ABSTRACT

A temple structure for eyeglasses is formed of a spring hinge box, a piece of elastic metal wire folded in two, a flange connecting the spring fringe box and the piece of elastic metal wire, and an ear chip. The spring hinge box has a one-piece knuckle and a hollow with an opening, on its front side, and a longitudinally frontward threaded hole at the end of its rear side. The piece of elastic metal wire folded in two is designed to have its two free ends located near the ear of a wearer with its head portion positioned on the side face of the spring hinge box and its arm portion formed in a streamline or tear-drop shape to have a hollow. The flange, provided with a screw hole, is positioned in the hollow, through which a screw is driven into the threaded hole provided at the rear end of the spring hinge box, thereby fixing the piece of elastic metal wire onto the side face of the spring hinge box. The two free ends of the piece of elastic metal wire are fit in the ear chip.

10 Claims, 5 Drawing Sheets

TEMPLE STRUCTURE FOR EYEGLASSES

BACKGROUND OF THE INVENTION

The present invention relates to a metal temple structure for eyeglasses. Conventional metal temples for eyeglasses can be roughly classified into two groups—one temple is made of relatively broad low-elasticity metal material and the other temple is made of fine wire-formed high-elasticity metal material. The temple made of low-elasticity metal material has the disadvantage of requiring to make up for the insufficient resiliency a relatively broad spring hinge, which causes the weight to be increased, resulting in an increased load on the ears and nose of an wearer. In contrast, the temple made of fine wire-formed high-elasticity metal material is sufficiently resilient to eliminate the use of such a spring hinge as required for the temple mentioned above as the first group, but has the disadvantage of tending to be relatively low in strength, undergoing deflection when they hold a spectacle front frame, the weight of which exceeds a certain level. They also have the disadvantage of allowing little design modification.

The present invention, therefore, improves the strength of the temples mentioned above as the second group with maintaining their lightweight and resilience.

SUMMARY OF THE INVENTION

An object of the present invention is the provision of a new metal temple structure for eyeglasses, which overcomes the disadvantages of the conventional temples mentioned above as the second group, thereby providing flexible temples while maintaining the resilience of such conventional temples.

In one preferred embodiment of the present invention, the temple structure for eyeglasses thereof mainly comprises a spring hinge box, a piece of elastic metal wire folded in two, a flange connecting said spring hinge box and said piece of elastic metal wire, and an ear chip. Said spring hinge box has a one-piece knuckle and a hollow with an opening, which houses a spring hinge member connected to said one-piece knuckle, on its front side, and a longitudinally frontward threaded hole at the end of its rear side. Said piece of the elastic metal wire folded in two is designed to have its two free ends located near the ear of a wearer with its head portion positioned on the side face of said spring hinge box and its arm portion formed in a streamline or tear-drop shape to have a hollow with an opening. Said flange, provided with a screw hole, is positioned in said hollow with an opening, through which a screw is driven into the threaded hole provided at the rear end of the spring hinge box, thereby fixing the piece of elastic metal wire onto the side face of the spring hinge box. Said two free ends of the piece of the elastic metal wire are fit in said ear chip.

DETAILED DESCRIPTION OF THE INVENTION

Figure 1:
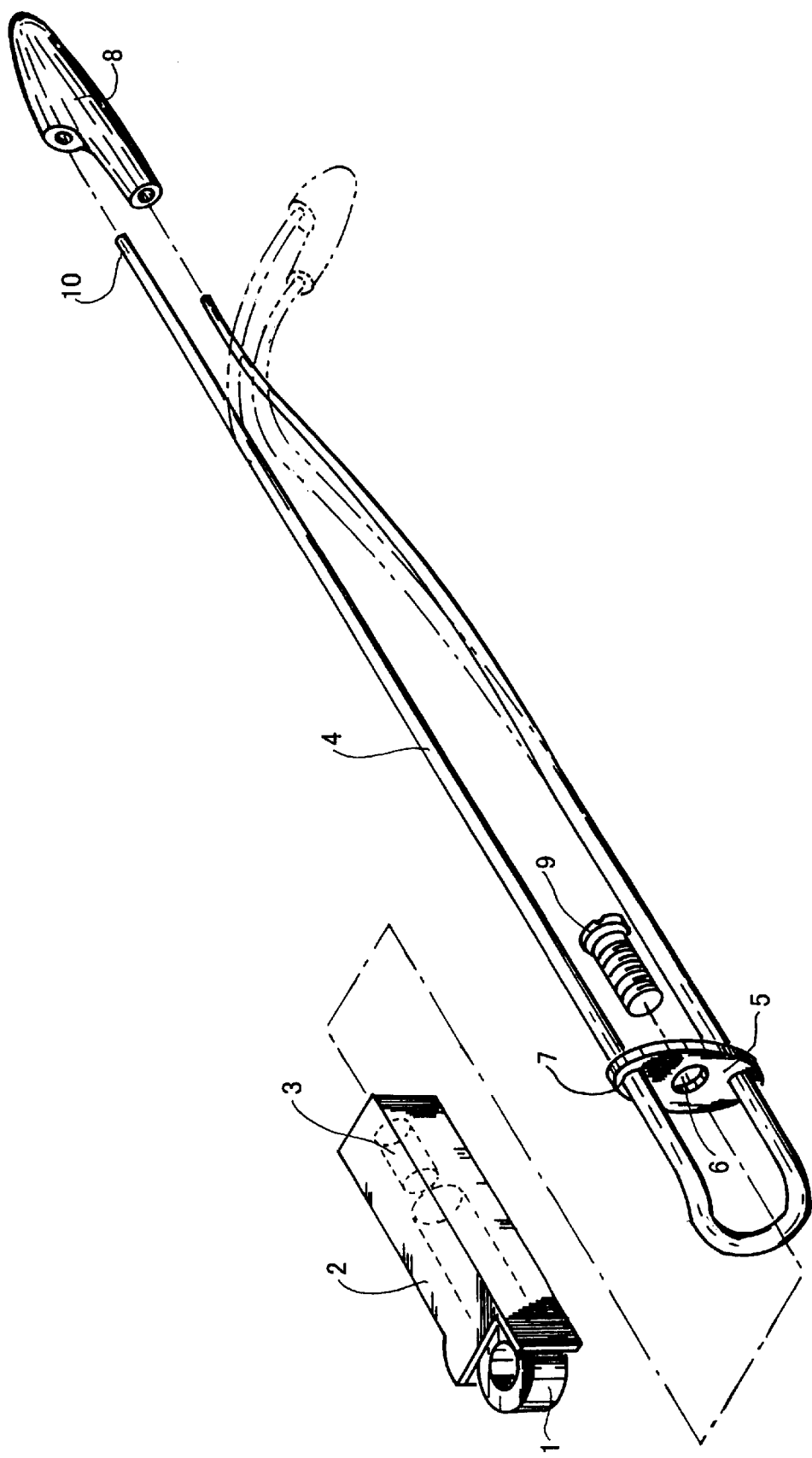
FIG. 1 is an exploded view in perspective of the temple structure of the present invention.

Referring to the embodiment of the present invention shown in FIG. 1, spring hinge box 2 houses one-piece knuckle 1 and a spring hinge member (not shown in detail because it is excluded from what is claimed in the present invention) connected to said one-piece knuckle on its front side and longitudinally frontward threaded hole 3 at the end of its rear side, behind which is located a piece of elastic metal wire constituting temple 4 folded into two with its folded portion slightly bent outward or inward to avoid collision with said spring hinge box 2. An its arm portion formed in a streamline or tear-drop shape has a hollow with an opening, and its free ends 10 are positioned near the ear of a wearer. Said spring hinge box 2 and said temple 4 are connected by driving screw 9 passing through screw hole 6 provided in said frange 5 and entered into said longitudinally frontward threaded hole 3 provided at the end of the rear end of said spring hinge box 2. Said free ends 10 of said temple 4 are bent inward and fit into ear chip 8 made of synthetic resin as shown in alternate long short dash lines. The above-described temple structure of the present invention allows the spring hinge opening angle to be further increased for adaptation to a wearer even if his or her forehead is a slightly broad. In addition, the temple structure provided in the present invention is not subject to any deflection of its wire material due to the weight of the spectacle front frame it holds, and is flexible in design modification.

Further, the temple structure of the present invention eliminates the need for brazing. The preferred material of the elastic metal wire used in the invention includes titanium alloy and stainless steel.

Figure 2:
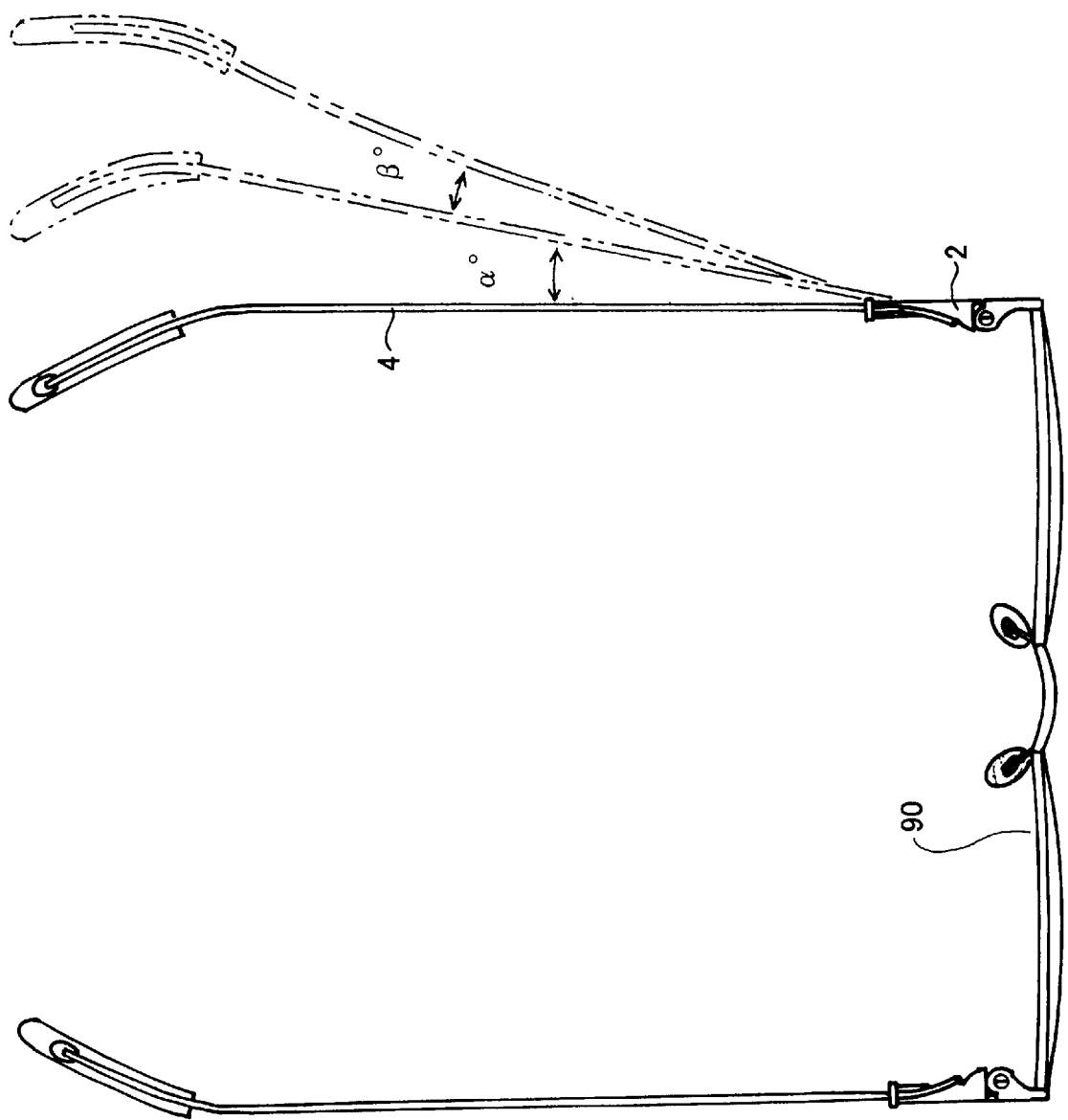
FIG. 2 is a plan view of the temple structure of the present invention, mounted on the front frame in an open state.

FIG. 2 is a plan view of the temple structure of the present invention, mounted on the front frame 90 of a spectacle in an open state, showing that it allows the elastic wire temple 4 to deflect from angle of α° obtainable with a conventional spring hinge to α°+β°, helping a wearer to put on the spectacle in an easy way.

Figure 3:
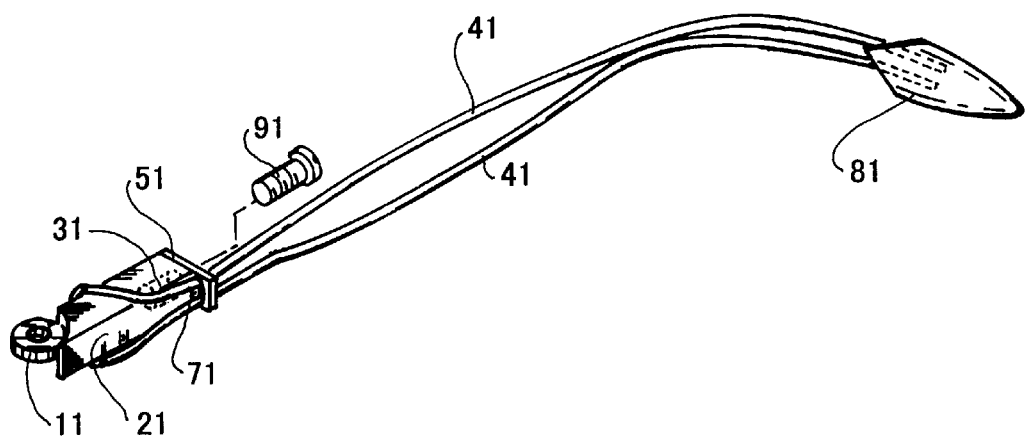
FIG. 3 is a perspective view of another embodiment of the present invention.

FIG. 3 is a perspective view of a second embodiment of the present invention, comprising one-piece knuckle 11 and metal column 21 formed as a unit by pressing, punching or casting, wherein said column 21 has frontward threaded hole 31 on its rear end, behind which is located a piece of elastic metal wire folded into two to constitute temple 41 passed through hole 71 drilled in flange 51. Thut the arm portion of said wire temple 41 forms a hollow with an opening, extending to the ear of a wearer to fit its free ends in ear chip 81, with the folded portion of said wire temple 41 positioned on the opposite side of said flange 51. This embodiment of the present invention eliminates the need for the use of a spring hinge in securing the resilience of the temple and its strength. The components of the two embodiments of the temple structure of the present invention as shown in FIGS. 1 and 3 are not fixed in their combination, but can be optionally recombined to expand its variation.

Figure 4:
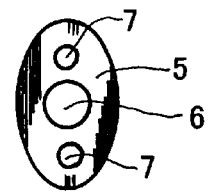
FIG. 4 is a plan view of the flange constituting a part of the temple structure of the present invention.
Figure 5:
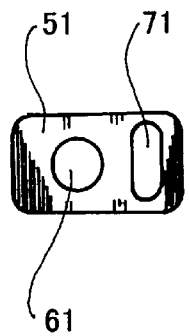
FIG. 5 is a plan view of another modified embodiment of the flange constituting a part of the temple structure of the present invention.

FIGS. 4 and 5 are plan views of two embodiments of the flange constituting a part of the temple structure of the present invention—the former 5 comprises two holes 7 through which the two arms of the metal wire separately pass and one screw hole 6, and the latter 51 comprises one hole 71 through which the two arms of the metal wire pass together and one screw hole 61, neither of which are intended to specify whether it should be used vertically or horizontally or limit its shape.

Figure 6:
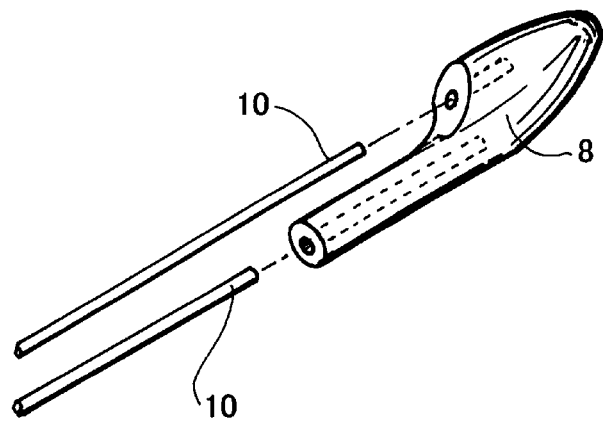
FIGS. 6, 7 and 8 are perspective views of various embodiments of the ear chip employed in the present invention.

FIG. 6 illustrates ear chip 8 employed in the present invention to hold the free wire temple ends 10 different in length, which is made of synthetic resin, having two holes in which the free ends 10 are fixed by using adhesive or the like.

Figure 7:
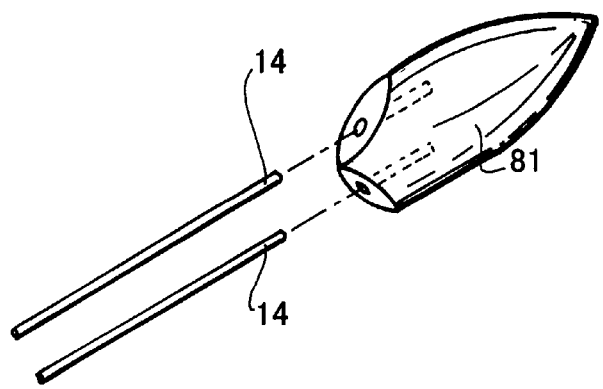

FIG. 7 illustrates ear chip 81 employed in the present invention to hold free wire temple ends 14 identical in length, which is made of synthetic resin, having two holes in which to fix the free ends 14 using adhesive or the like.

Figure 8:
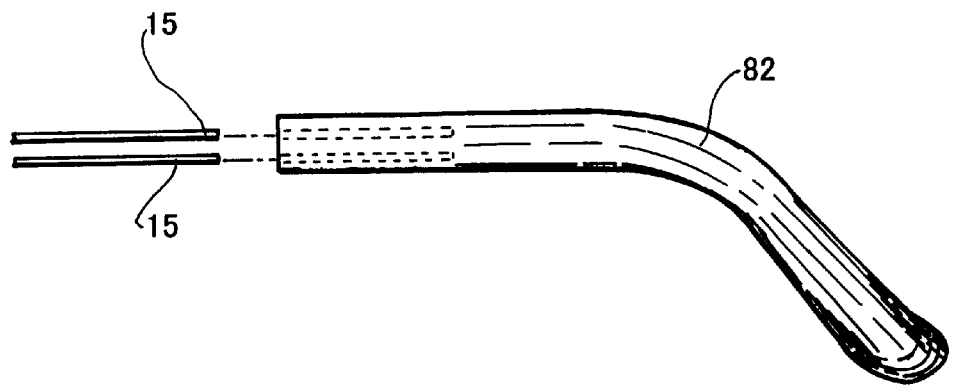

FIG. 8 illustrates ear chip 82, which is similar in form to conventional ones, but, as in the case of Figs.6 and 7, has two holes in which free wire temple ends 15.

Figure 9:
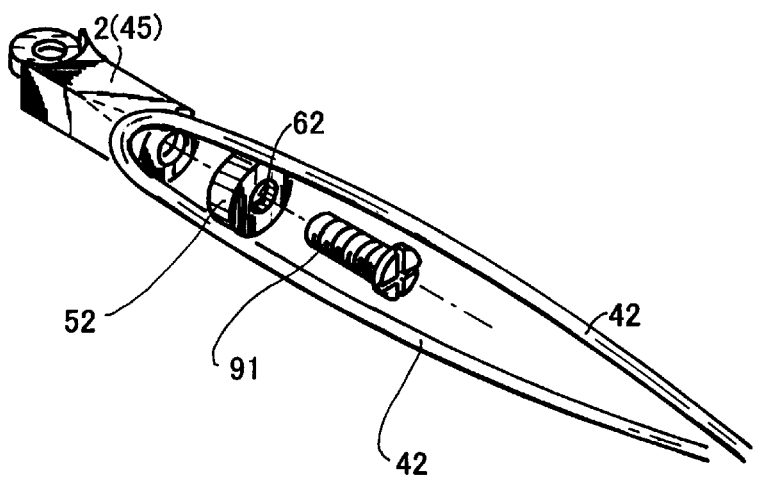
FIG. 9 is a perspective view of another embodiment of the present invention.
Figure 11:
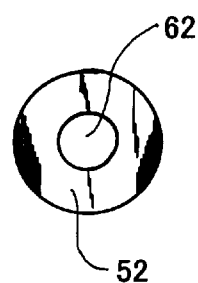
FIG. 11 gives plan views of other embodiments of the flange constituting a part of the temple structure of the present invention.

FIG. 9 illustrates a modified embodiment of the present invention, wherein flange 52 with one screw hole 62 as shown in FIG. 11 is brazed on the front side of a hollow with an opening formed by two arms 42 of elastic wire temple so that it is held between said two arms of said wire temple, and fixed to the spring hinge box 2 or column 45 by driving screw 91 entering into the threaded hole drilled at the rear end of said spring hinge box or column. This temple structure also achieves the object of the present invention mentioned earlier. The material of the elastic wire that is useful in the invention can comprise titanium alloy and stainless steel.

Figure 10:
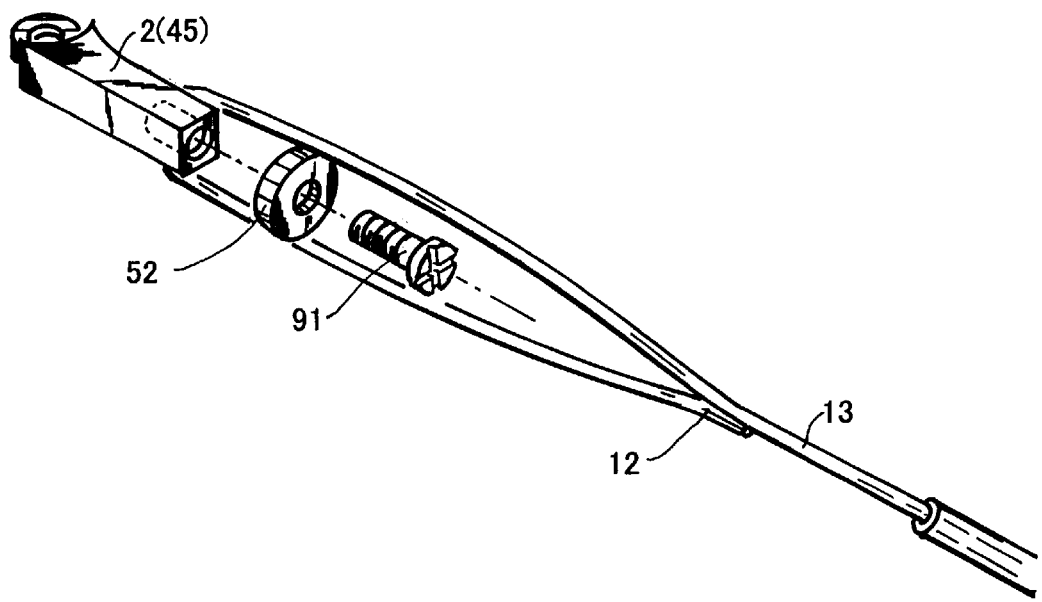
FIG. 10 is a partially exploded view in perspective of another embodiment of the present invention.

FIG. 10 illustrates another modified embodiment of the present invention, wherein free end 12 of one arm of the temple wire is brazed to the middle point of its other arm 13, the free end of which is fit in a conventional ear chip with one hole.

FIG. 11 illustrates the embodiment of the flange useful in the present invention, which, as shown in FIGS. 9 and 10, is designed to be of such a configuration that it can be brazed to the arms of the temple wire within a hollow with an opening formed by the arms.

Obviously many other modifications and variations of the present invention are possible, wherein the elastic metal wire useful in providing the temple structure of the present invention can be folded in various shapes. As another example of such other modifications and variations of the present invention flange 5 that is useful in the present invention can be designed in various forms. In addition, the combination and arrangement of the parts useful in the present invention can be made in other ways than specifically described in the drawings hereto attached.

It is therefore to be understood that any changes, variations and modifications of the present invention that fall within the true scope of the present invention are included in the scope of the claims thereof.

What is claimed is:

1. A metal temple structure for eyeglasses, comprising:
   a spring hinge box having a hollow portion, an opening formed at a front side to communicate with the hollow portion, a one-piece knuckle situated in the hollow portion through the opening, and a threaded hole formed at a rear side thereof,
   an elastic metal wire folded into two sections and having two free ends to be located near an ear of a wearer, a head portion located on a side of the spring hinge box, and an arm between the head portion and the free ends and having a stream line shape with a hollow section formed by the two sections,
   a flange fixed to the metal wire at the hollow section for connecting the spring hinge box and the elastic metal wire, said flange having a screw hole,
   a screw passing though the screw hole of the flange and engaging the threaded hole of the spring hinge box to thereby fix the metal wire to a side face of the spring hinge box, and
   an ear clip fixed to the free ends of the wire.

2. A temple structure for eyeglasses as claimed in claim 1, wherein said flange further includes at least one hole through which the arm of the metal wire passes.

3. A temple structure for eyeglasses as claimed in claim 1, wherein said flange is located in the hollow section formed by the two sections on a front side of the metal wire and is brazed to the metal wire.

4. A temple structure for eyeglasses as claimed in claim 1, wherein said ear clip has two holes into which the free ends of the metal wire are fitted.

5. A temple structure for eyeglasses as claimed in claim 1, wherein one of the free ends of the metal wire is brazed to a middle portion of the other of the free ends.

6. A metal temple structure for eyeglasses, comprising:
   a metal column with a hinge knuckle having a threaded hole formed at a rear side thereof,
   an elastic metal wire folded into two sections having two free ends to be located near an ear of a wearer, a head portion located on a side of the metal column, and an arm between the head portion and the free ends and having a stream line shape with a hollow section formed by the two sections,
   a flange fixed to the hollow section of the metal wire for connecting the metal column and the metal wire, said flange having a screw hole,
   a screw passing though the screw hole of the flange and engaging the threaded hole of the metal column to thereby fix the metal wire to a side face of the metal column, and
   an ear clip fixed to the free ends of the wire.

7. A temple structure for eyeglasses as claimed in claim 6, wherein said flange further includes at least one hole through which the arm of the metal wire passes.

8. A temple structure for eyeglasses as claimed in claim 6, wherein said flange is located in the hollow section formed by the two sections on a front side of the metal wire and is brazed to the metal wire.

9. A temple structure for eyeglasses as claimed in claim 6, wherein said ear clip has two holes into which the free ends of the metal wire are fitted.

10. A temple structure for eyeglasses as claimed in claim 6, wherein one of the free ends of the metal wire is brazed to a middle portion of the other of the free ends.

\* \* \* \* \*